Patented Aug. 27, 1929.

1,725,791

UNITED STATES PATENT OFFICE.

MORTIMER T. HARVEY, OF NEW YORK, N. Y., ASSIGNOR, BY DIRECT AND MESNE ASSIGNMENTS, TO THE HARVEL CORPORATION, A CORPORATION OF NEW JERSEY.

RESIN FROM CASHEW-NUT-SHELL OIL.

No Drawing.   Application filed June 17, 1925. Serial No. 37,865.

My present invention relates to an article of manufacture, to a composition of matter therefor, and to the art of producing the composition of matter. It relates more particularly to a synthetic resin or resins made from the oil which occurs naturally in the cellular spaces which exist between the hard horny shell and the kernel of the cashew nut.

The cashew nut of the Anacardium family has long been known to carry just inside the hard, horny shell thereof a protective layer about the kernel which comprises a light cellular structure which is filled completely about the kernel with an oil which is brown in color, is of low viscosity, has an iodine value of more than 230 and as high as 296 to 300 in the natural and commercial states, and has a virulent action on the skin. On account of this action it has been considered unsuited for uses which otherwise could be made of it and heretofore no uses have been found where this action would be of consequence or where it could be taken to advantage to secure a useful result. Large quantities of the oil are thrown away annually because of this lack of use. Further, great quantities of the nut kernel are either not brought to this country, at all or are thrown away as soon as they reach here because heavy losses of the shelled kernels are sustained during shipment due to spoiling by worm growth. If, however, the shell is left on, the nuts can be stored indefinitely and will stand shipment under otherwise unfavorable conditions and climates without loss. But the cost of removing the shells with labor at rates prevalent in this country is prohibitive due to difficulty of handling the virulent oil inside the shell. The added cost of the transportation of the weight of this oil for which no use has heretofore been found is a further disadvantage which discourages and renders impractical the use of this nut which grows in prodigious quantities in the West Indies, Brazil and in India and whose kernel is highly valuable for food and for the oil occurring in the kernel itself. So it can be seen on account of the nature of the oil of its shell that not only is the shell oil lost to human use but also the use of the kernel and the kernel oil is lost.

I have, however, discovered a highly valuable use for this oil which will make it a practical commercial proposition to transport the nuts to this country in the shells and to pay for the removal of the shells with labor at the prevailing rates and make the nut kernels saleable at prices not prohibitive. But the use of the shell oil according to my invention will itself provide a source of material useful in many arts and from which many articles of manufacture can be made.

I have discovered that synthetic resins and lacquer may be made from the oil which occurs between the hard outside shell and the kernel of the cashew nut. According to my invention I condense this oil by heating it to from 100° to 200° centigrade. The condensation I find is aided by the use during the heating of the oil of a catalyst therewith such as for example, an acid or an alkali. I further have found that valuable condensation products can be made by heating this oil together with an aldehyde such as formaldehyde with or without the use of a catalyst such as hydrochloric acid. This reaction is due in a large part to the existence of a great number of active groups present in the natural oil, which groups appear to unite with the aldehyde giving a resulting product similar in many respects to the synthetic resins called "bakelite."

But possibilities exist with the use of the cashew shell oil which are unheard of in the "bakelite" and allied arts as heretofore practiced. One of these results is the use of synthetic resins and lacquers of this nature where it was prohibitive in price, because now there can be used the millions of gallons which are formed yearly by the growth of the nuts.

Another result is the possibility of new uses for resins of this nature. These new uses are possible because of the occurrence of this oil in the liquid state and with molecules, as I find, having a great number of groups which are very active toward aldehyde compounds. This, I further find, makes it possible to stop the condensation reaction of the oil at desired states of fluidity thereof, as it changes from the liquid state to the completely condensed or solid state. The liquid is then used as it is for lacquers or other purposes or else it is applied to fabrics or mixed with fillers and when desired further condensed to a desired state of hardness. Heretofore phenol, ortho and meta cresol, resorcinol, and carvacrol among others have been used to produce phenolic condensation products but these have only one active group in their molecules and the resins made from them are either semi-solid or highly viscous and require high temperatures to render them plastic and to cure them. Further, as heretofore made, resins of this nature have been, due to this hardness, inapplicable for many uses, such for example as the impregnation of fabrics with the resins in the liquid state and the curing or the continued condensation to a solid or highly viscous state thereof in the fabric as in the manufacture of electrical insulation.

Further, by the use of this oil molded articles of the solid resin or a mixture thereof with a suitable filler such as a slate dust can be made without the use of the excessive temperatures and pressures which are necessary for the production of resins from phenol and the like because the resins heretofore made have such high viscosities or are solids which are with difficulty rendered plastic.

Further, resin-impregnated fabrics for insulation or other uses can be made much cheaper because the fabric can be immersed in the liquid and partly condensed resin and the impregnated fabric then removed and cured to secure the condensation of the resin to the desired degree. Again, flexible fabrics impregnated with resins of this nature such as were not heretofore procurable can be made by curing fabric impregnated with the liquid resin of my invention to the desired degree of hardness and flexibility of the combined fabric and resin.

The high cost of phenol and other manufactured products heretofore used for making synthetic resins has limited the extent to which these resins have been used. But on account of the great quantities in which the cashew shell oil occurs in nature and the comparatively very low cost thereof resins can now be made and used for a great number of uses where they will replace less suitable or more costly material.

In the production of resins according to my invention, as an example, approximately equal volumes of the cashew shell oil and an aldehyde (a 40% solution of formaldehyde in water) with or without the presence of a catalyst (as HCl) and in quantity about 10% of the total volume are heated at a temperature between 100° and 200° centigrade. The aqueous layer which separates is rejected and the oily liquid which is soluble in alcohol and acetone may be heated a little longer to drive off any water which may be present in the mass. On exposing this latter material which has been rendered viscous by further heating at 80° to 140° centigrade under sufficient pressure to hold in the escaping gases a hard compact moulded body is obtained after a short time under these conditions.

A similar viscous oil which may be obtained by heating equal weights of the cashew shell oil and hexamethylenetetramine in an aqueous solution at a temperature between 60 and 80° centigrade. In forty minutes a hard resin is produced. In fifteen minutes a liquid resin is produced suitable for impregnating the cotton tape such as is commonly used to cover wire coil windings which are mounted in the rotor and stator of electric motor and generators. During the heating formaldehyde is produced, and this reacts with the cashew nut shell liquid to form a condensation product.

After the impregnation of such taped coils they are heated, and molded at certain parts, to further condense the resin and to produce an insulated coil having a covering of high dielectric strength and a hardened tough finish which will fit at required parts with precision in slots in the electric apparatus and which will withstand vibrations, changes of temperatures, continued high temperatures, exposure to oil, water, or damp and abrasion by dust in the air, and will continue with these characteristics over an extended period of time.

Although I have described particularly my invention as applied to impregnated fabric insulation it is to be understood that its use and practice extends wherever shellac, "bakelite", and the like are now used and to many other uses to which such other materials are not applicable. Further the proportions used may be varied to suit the results desired, temperatures worked at, and to be subjected to in use, and the conditions of application in a manner apparent from the foregoing to one skilled in the art. Where the finished material will be subjected to extreme temperatures the condensate is cured at temperatures up to a point just below the temperature at which it will disintegrate.

I claim:

1. A synthetic resin-like substance of the condensed oil from the shell of the cashew nut.

2. A condensation product of cashew shell oil.

3. A condensation product of cashew shell oil and an aldehyde.

4. A condensation product of cashew shell oil and formaldehyde.

5. A condensation product of equal volumes of cashew shell oil and a forty per cent solution of formaldehyde in water.

6. The method of producing a synthetic resin which comprises heating together cashew shell oil and an aldehyde until a desired viscosity or hardness is secured.

7. The method of producing a synthetic resin which comprises heating cashew shell oil and a forty per cent water solution of aldehyde in approximately equal volumes together with hydrochloric acid at temperatures between 100 and 200° centigrade until a desired viscosity or hardness of the condensate is obtained.

8. The method of producing a condensate which comprises heating at 100 to 200° centigrade a mixture of cashew shell oil and a substantially forty per cent solution of formaldehyde in water in approximately equal volumes together with concentrated hydrochloric acid in quantity about ten per cent of the total volume until a desired viscosity or hardness is acquired.

9. The method of producing a composition of matter which comprises reacting cashew nut shell liquid and an aldehyde.

10. The method of producing a composition of matter which comprises reacting cashew nut shell liquid and formaldehyde.

11. The method of producing a synthetic resin-like substance which comprises reacting cashew nut shell liquid and an aldehyde with the aid of a catalyst.

12. The method of producing a synthetic resin-like substance which comprises reacting cashew nut shell liquid and formaldehyde with the aid of a catalyst.

13. The method of producing a synthetic resin-like substance which comprises reacting cashew nut shell liquid and an aldehyde with the aid of hydrochloric acid.

14. The method of producing a synthetic resin-like substance which comprises reacting cashew nut shell liquid an formaldehyde with the aid of hydrochloric acid.

15. A composition of matter comprising the reaction product of cashew nut shell liquid and formaldehyde.

16. A composition of matter obtained by the reaction of cashew nut shell liquid and an aldehyde.

17. A resin-like condensation product of a liquid from the shell of a nut of the Anacardium family and having an iodine value between 230 and 300.

18. A composition of matter obtained by the reaction of formaldehyde and a liquid from the shell of a nut of the Anacardium family, having an iodine value between 230 and 300.

19. A product of cashew nut shell oil and formaldehyde condensed in the presence of heat.

20. A composition of matter containing a condensation product of cashew nut shell oil, formaldehyde, and an agent adapted to promote polymerization.

21. A material adapted to be solidified after application and comprising a condensation product of cashew nut shell oil, formaldehyde and a filler.

22. The method of manufacturing a composition of matter which comprises producing formaldehyde in the presence of cashew nut shell oil and causing a reaction therebetween with the aid of heat.

23. A composition of matter obtained by producing formaldehyde in the presence of cashew nut shell oil and causing a reaction therebetween with the aid of heat.

24. A composition of matter obtained by reacting cashew nut shell liquid and formaldehyde with the aid of heat and a catalyst.

25. The method of manufacturing a composition of matter which comprises reacting cashew nut shell liquid and formaldehyde with the aid of heat and a catalyst.

26. The method of producing a composition of matter which comprises subjecting cashew nut shell liquid to the action of formaldehyde with the aid of heat.

27. The method of producing a composition of matter which comprises reacting cashew nut shell liquid and formaldehyde in the presence of an acid catalyst.

28. The method of producing a composition of matter which comprises reacting cashew nut shell liquid and formaldehyde in the presence of an acid catalyst with the aid of heat.

Signed at Chicago in the county of Cook and State of Illinois this 9th day of May, A. D. 1925.

MORTIMER T. HARVEY.